United States Patent [19]

Hashimoto

[11] Patent Number: 4,918,721

[45] Date of Patent: Apr. 17, 1990

[54] PUSH BUTTON PHONE CAPABLE OF SENDING TO THE TELEPHONE LINE ALPHABETICAL CHARACTERS

[75] Inventor: Kazuo Hashimoto, Tokyo, Japan

[73] Assignee: Hashimoto Corporation, Tokyo, Japan

[21] Appl. No.: 237,944

[22] Filed: Aug. 24, 1988

[30] Foreign Application Priority Data

Aug. 24, 1987 [JP] Japan .................. 62-209720

[51] Int. Cl.$^4$ .......................... H04M 11/06
[52] U.S. Cl. ........................ 379/96; 379/97; 379/52
[58] Field of Search ................ 379/52, 96, 97

[56] References Cited

U.S. PATENT DOCUMENTS

| | | | |
|---|---|---|---|
| 4,426,555 | 1/1984 | Underkoffler | 379/52 |
| 4,427,848 | 1/1984 | Tsakanikas | 379/97 |
| 4,503,288 | 5/1985 | Kessler | 379/96 |

FOREIGN PATENT DOCUMENTS

| | | |
|---|---|---|
| 1320896 | 6/1973 | United Kingdom . |
| 2147769 | 5/1985 | United Kingdom .................. 379/97 |
| 80/00517 | 3/1980 | World Int. Prop. O. . |

Primary Examiner—Jin F. Ng
Assistant Examiner—Wing F. Chan
Attorney, Agent, or Firm—Lowe, Price, LeBlanc, Becker & Shur

[57] ABSTRACT

A pushbutton telephone is used by a calling party to transmit both upper and lower case alphabetical characters on the telephone lines. Upper and lower case characters are selected for transmission by the caller by pressing combinations of keys, including a special key (#) or (*), of a telephone keypad. The combination of keys successively pressed is detected by a receiving terminal at the station of the called party, and a signal representing a corresponding upper case or lower case letter is decoded by the terminal and displayed.

9 Claims, 4 Drawing Sheets

PUSH BUTTON PHONE CAPABLE OF SENDING TO THE TELEPHONE LINE ALPHABETICAL CHARACTERS

TECHNICAL FIELD

This invention relates generally to a pushbutton phone capable of sending on the telephone lines alphabetical characters and more particularly toward such a push button phone capable of sending on the lines both lower and upper case alphabetical characters.

BACKGROUND

At the present time pushbutton phones have now found their way into many homes. The conventional pushbutton phone can send numbers, but cannot send alphabetical characters. When the pushbutton phone is used, in order to exchange information between a user and for example, a bank, a specific pushbutton phone could send or input a figure or a symbol as information. Thus, a major problem encountered in such a pushbutton phone is that it can not send any alphabetical characters directly.

DISCLOSURE OF THE INVENTION

It is an objective of the present invention to provide a pushbutton phone capable of sending on the telephone lines alphabetical characters, which sends not only upper case letters which are printed on the keypad of a pushbutton phone in United States but also lower case letters on the telephone lines. Incidentally, a pushbutton phone which sends only alphabetical characters, etc. which are put on the keypad of a pushbutton phone as characters and are sent to the other party, has been filed at the Japanese Patent Office by the same applicant. (Application No. 580188732)

Still other objects and advantages of the present invention will become readily apparent to those skilled in this art from the following detailed description, wherein only the preferred embodiment of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR PRACTICING THE INVENTION

Figures 1, 2:
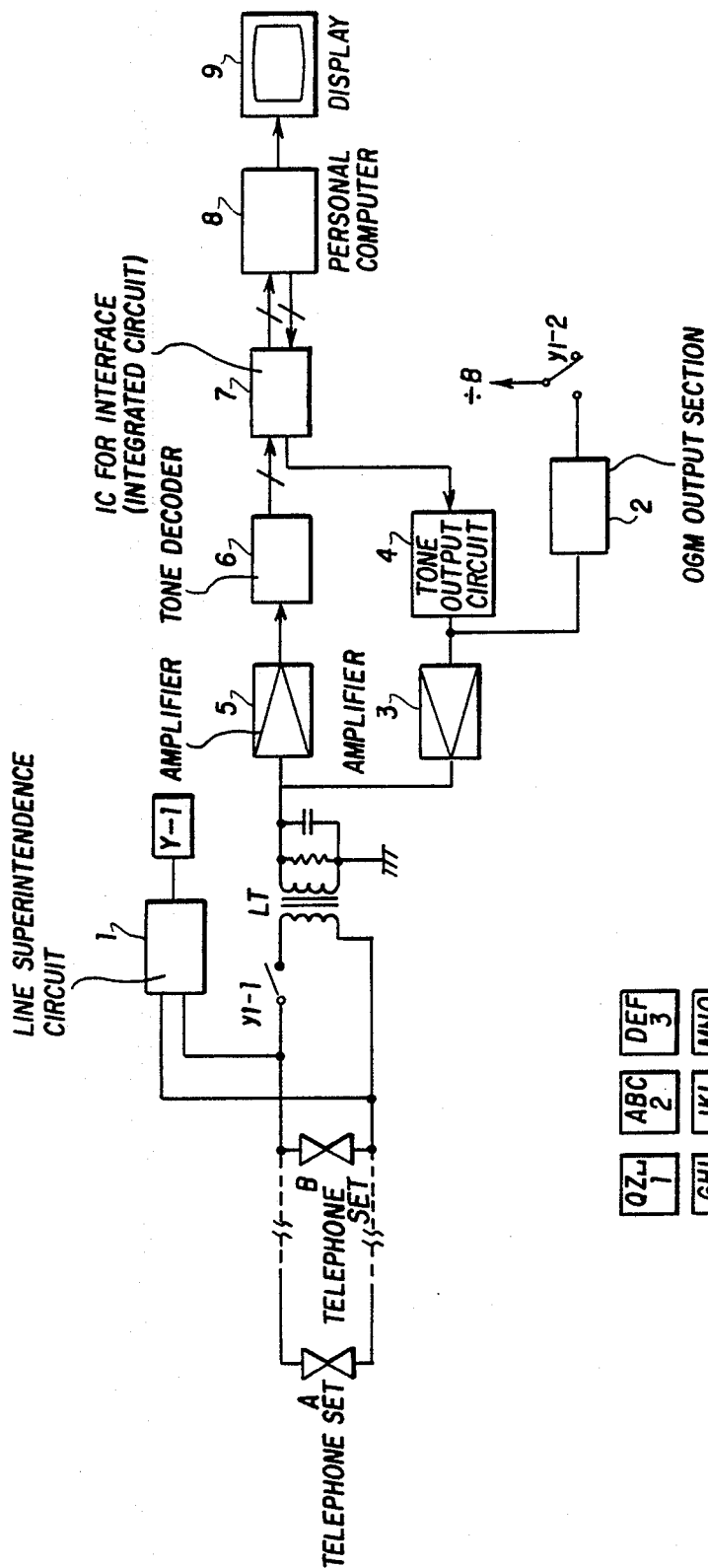
FIG. 1 is a block diagram of the preferred embodiment of the invention.
FIG. 2 is an arrangement view of keypad of a pushbutton phone (telephone set A).

In FIG. 1, A is a telephone set for calling, B is a telephone set for receiving, 1 is line superintendence circuit which detects calling signals and controls operation of load rely Y-1. When the circuit 1 detects a change of voltage of the telephone lines in accordance with on-hooking of telephone set A by the caller, it restores the load rely Y-1. LT is a line transformer, 2 is an OGM transmitting section which transmits outgoing message (OGM), when the load rely Y1-2 is switched on. 3 is an amplifier and 4 is a tone output circuit which outputs a tone to a caller in order to make a caller confirm a capital (uppercase) letter or small (lower case) letter. 6 is a tone decoder which outputs DTMF tone 5 decoded using the binary number system. 7 is an IC (integrated circuit) for interface which interfaces a personal computer, for example, an 8255 made by Intel. 8 is a personal computer, for example, a PC-9801 made by NEC and 9 is a display.

FIG. 2 is an arrangement view of a keypad of the pushbutton phone A, where the mark  means a space.

Figure 3:
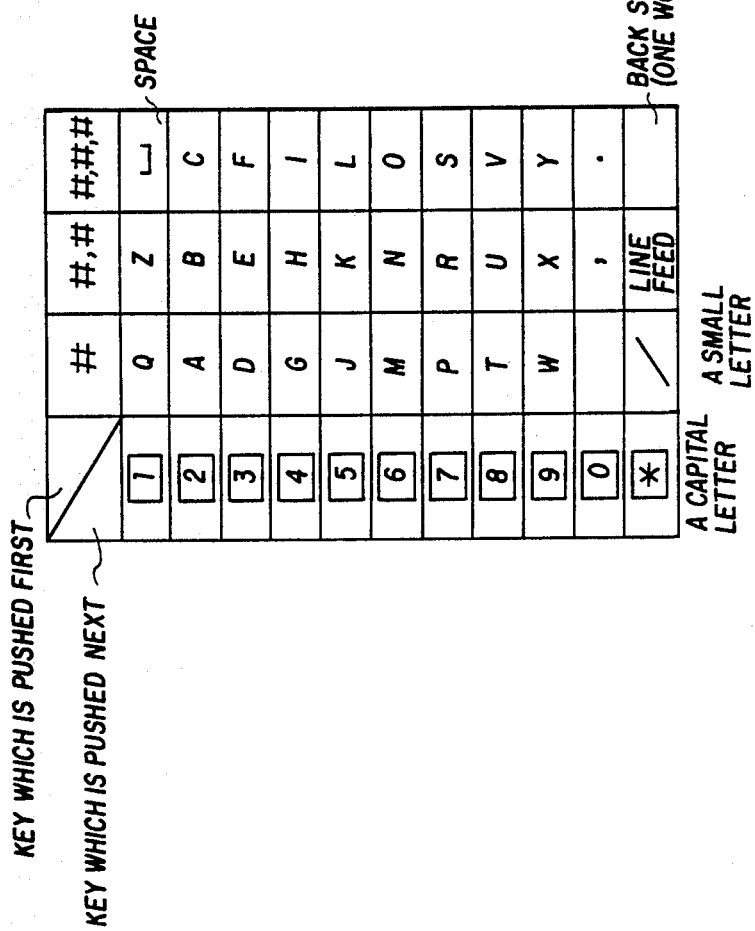
FIG. 3 is an explanatory view of a first embodiment of the invention.

FIG. 3 shows the function of the keypad, wherein, for example, if a caller pushes key "#" once, and pushes key "1" once, a program determines that it receives letter "Q" and displays letter "Q" on the said display 9. Similarly, if a caller pushes key "#" twice in succession and pushes key "1" once, the program determines that it receives the letter "Z" and displays letter "Z" on the said display 9.

Furthermore, if a caller pushes key "#" once and pushes key "*" once, indication of a capital letter is changed to indication of a lower case letter. On the other hand, when the display indicates lower case letters, a caller pushes key "#" once and pushes key "*" once, and as a result, indication of a lower case letter changes to indication of a capital letter. And if a caller pushes key #" twice and key "*" once, as a result, a new line is opened. And further, if a caller pushes key "#" three times and pushes key "*" once, the indication is back spaced.

Concrete operation is explained in FIG. 1, FIG. 2, FIG. 3 and the flow chart of FIG. 4 as follows:

When power is supplied to each circuit and personal computer 8 etc. which is shown in FIG. 1, the personal computer 8 reads out a corresponding program from a disc (not shown) and functions automatically.

A flag F is set at "0" (Step 40), the number N of a counter is set at "0" (Step 41), and whether the DTMF tone of a pushbutton phone which is sent from caller, corresponds to a "*" is tested. The DTMF tone is not input to this pushbutton phone, because the pushbutton phone is in a waiting state and, as a result, Step 40 is determined as "no" and is advanced to Step 44. And also the result of Step 44 is "no", so that Step 42 and subsequent steps (not shown) are looped. If a personal computer 8 carries out other operations while the steps are looped, it can execute the other operations of the program shown in the flow chart when the signal is received.

In FIG. 1, when the telephone set B receives a calling signal from the telephone set A, a calling signal is detected by the line superintendence circuit 1, and maintains operation of load relay Y-1. And contact Y1-1 of relay Y-1 makes a DC (direct current) loop through a line transformer LT. As a result, it is possible to talk over the telephone. At the same time, OGM transmitting section 2 comes into operation by a contact Y1-2 and outputs an outgoing message which is recorded previously through an amplifier 3 and line transformer LT.

While talking over the telephone, a caller transmits a sentence including letters and (or) numbers by operation of the keypad shown in the FIG. 2. For example, when a caller transmits a capital letter "Q", a caller first pushes key "#" of keypad of the telephone set A once. By the way, in Step 40, Step 41, flag F, Counter N has been already cleared. As a result, when a caller pushes key "#" once, a value of N becomes "1" through Step 43, Step 60. Successively, a caller pushes key "1" once, and as a result, Step 44 becomes affirmative and shifts to Step 68, and Step 68 becomes affirmative, and also next Step 73 becomes affirmative. As a result, in Step 74, this program continues to output signal sounds (400 HZ) for about 0.2 second in the case of a capital letter. Therefore it is possible to confirm the capital letter. In FIG. 1, the DTMF tone from telephone set A is decoded to the binary number system by a tone decoder 6 through line transformer LT, amplifier 5, and is input to a personal computer 8 through the IC for interface 7 (8255), and triggers a tone output circuit 4 by outputting from a personal computer 8. In response, a tone output circuit 4 transmits signal sounds (400 HZ) for about 0.2 second to a caller.

In Step 75, the capital letter "Q" is displayed on a display 9, and in Step 85, counter N is cleared nd this program returns to the step 42 through path "a".

Similarly, when a caller pushes key "#" twice and pushes key "1" once, capital letter "Z" is displayed on a display 9 through Step 69, Step 78, Step 79 and Step 80. And when a caller pushes key "#" three times and pushes key "1" once, a space is made on the display 9 through Step 70, Step 83 and Step 84.

When a caller wants to change a capital letter to a lower case letter, the caller pushes key "#" once, and pushes key "*" once. As a result, counter N changes to "1", Step 42 becomes affirmative, and the program is shifted to Step 62 through Step 61. At this time, as flag F was "0" by step 40, the Step 62 becomes a "No" and the program is advanced to Step 63. The flag F is set at "1" and a signal sound (1000 HZ) is output for about 0.2 second. As a result, a caller can confirm whether a capital letter changes to a lower case letter. Next, this program clears a counter N (Step 64 and 67) and returns to Step 42.

Similarly, it is possible to change the lower case letter mode to the capital letter mode again by same operation.

In the lower case letter mode, for example, wherein a caller hopes to transmit a lower case letter "q", a caller pushes key "#" once and pushes key "1" once like transmitting capital letter "Q". In Step 73, the said flag F is tested and, as a result, flag F becomes a "No", because this mode is the lower case letter mode. Therefore, the program displays the lower case letter "q" on a display 9 through Step 76 and Step 77.

Figure 4A:
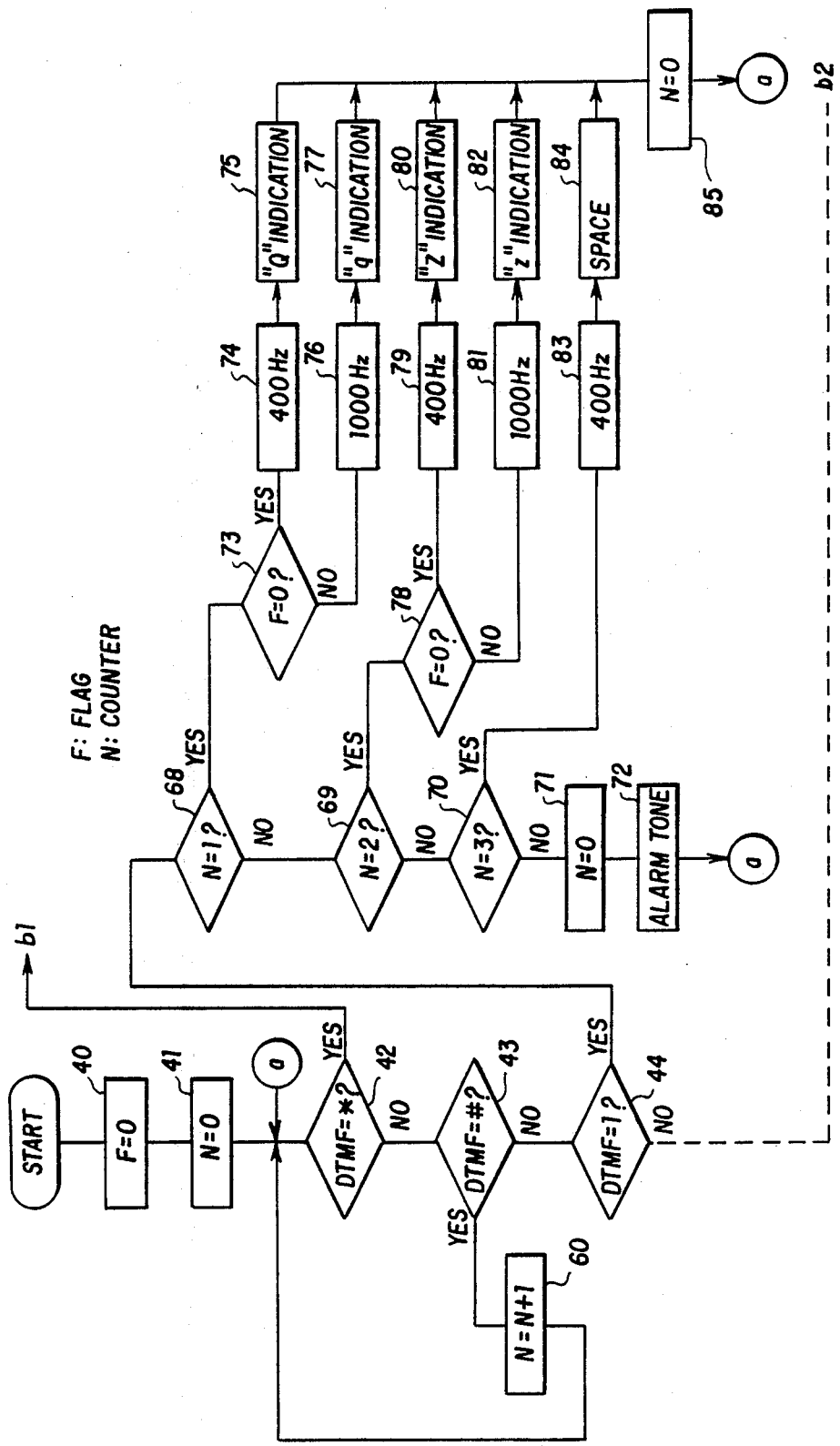
FIGS. 4-a and 4-b are flow charts for a first embodiment
Figure 4B:
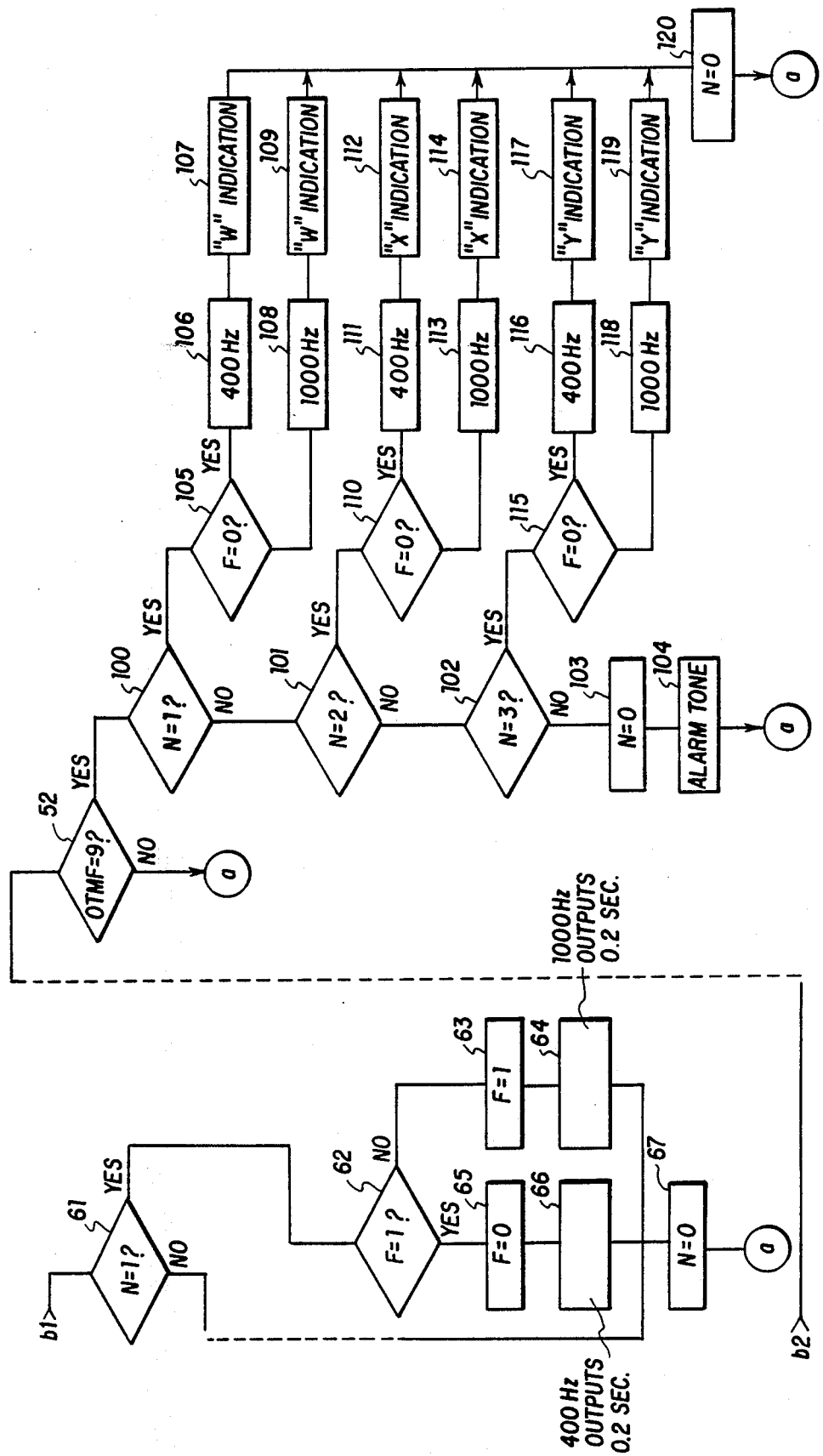

In the flow chart of FIG. 4, only capital letter "Q", "Z", "W", "X" and small letter "q", "z", "w", "x" and "space" are described, but the flow chart can apply other letters. When a caller hopes to transmit a number, the caller pushes a key corresponding to each number. As a result, a caller can transmit a sentence including the caller's telephone number and also can make a line feed, displaying sentences on the display 9 are that easy to read.

Figure 5:
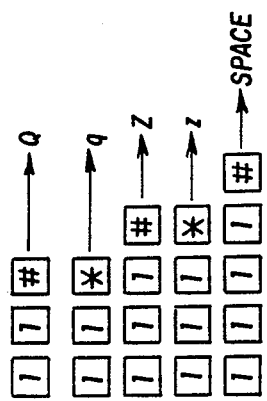
FIG. 5 is an explanatory view of a second embodiment of the invention.

FIG. 5 shows a key list of a second embodiment. Key "#" is set for a capital letter, and key "*" is set for a lower case letter. For example, when a caller pushes key "1" twice and pushes key "#" once, the display 9 displays the capital letter "Q". And also when the caller pushes key "*" once, the display 9 displays lower case letter "q". A flow chart of the second embodiment of this invention is not described. However, when a counter shown in FIG. 3 and discriminate means for discriminating between "*" and "#" are added in this invention, it is possible to form the invention like FIG. 3.

As the above, this invention can display all the functions which typewriters have by 12 keys, ten keys 0–9 and * and #. And this invention can make sentences including lower case letters with one hand during use of the telephone set. As a result, this invention is superior in economy and simplicity as a personal terminal. When an operator gets used to using the telephone set, he can type as fast as when the operator uses a teletype machine.

In this disclosure, there is shown and described only the preferred embodiment of the invention, but, as aforementioned, it is to be understood that the invention is capable of use in various other combinations and environments and is capable of changes and modifications within the scope of the inventive concept as expressed herein.

What is claimed is:

1. A terminal apparatus for receiving upper and lower case alphabetical characters and being coupled to telephone lines and to a pushbutton telephone having numerical keys used to represent alphabetical characters and special keys used to represent control characters and being capable of communicating on said lines upper and lower case alphabetical characters in the form of DTMF signals, said terminal apparatus comprising:

receiving means for receiving said DTMF signals;

decoding means responsive to said receiving means for decoding the DTMF signals corresponding to predetermined combinations of said keys being pressed; and controller means responsive to said decoded signals corresponding to a combination of at least one particular control character and a particular alphabetical character received in succession by said decoding means to generate an output electrical signal indicative of said particular alphabetical character in upper case or lower case.

2. The apparatus in claim 1, wherein said controller means is responsive to DTMF signals decoded by said decoding means, and outputs alphabetical characters in accordance with the following:

Q upon decoding of DTMF signals corresponding to # and 1 keys in succession,

Z upon decoding of DTMF signals corresponding to #, # and 1 keys in succession, one space upon decoding of DTMF signals corresponding to #, #, # and 1 keys in succession, A upon decoding of DTMF signals corresponding to # and 2 keys in succession, B upon decoding of DTMF signals corresponding to #, # and 2 keys in succession, C upon decoding of DTMF signals corresponding to #, #, # and 2 keys in succession, D upon decoding of DTMF signals corresponding to # and 3 keys in succession, E upon decoding of DTMF signals corresponding to #, # and 3 keys in succession, F upon decoding of DTMF signals corresponding to #, #, # and 3 keys in succession, G upon decoding of DTMF signals corresponding to # and 4 keys in succession, H upon decoding of DTMF signals corresponding to #, # and 4 keys in succession,
I upon decoding of DTMF signals corresponding to #, #, # and 4 keys in succession,
J upon decoding of DTMF signals corresponding to # and 5 keys in succession,
K upon decoding of DTMF signals corresponding to #, # and 5 keys in succession,
L upon decoding of DTMF signals corresponding to #, #, # and 5 keys in succession.
M upon decoding of DTMF signals corresponding to # and 6 keys in succession,
N upon decoding of DTMF signals corresponding to #, # and 6 keys in succession,
O upon decoding of DTMF signals corresponding to #, #, # and 6 keys in succession,
P upon decoding of DTMF signals corresponding to # and 7 keys in succession,
R upon decoding of DTMF signals corresponding to #, # and 7 keys in succession,
S upon decoding of DTMF signals corresponding to #, #, #, and 7 keys in succession,
T upon decoding of DTMF signals corresponding to # and 8 keys in succession,
U upon decoding of DTMF signals corresponding to #, # and 8 keys in succession,
V upon decoding of DTMF signals corresponding to #, #, # and 8 keys in succession,
W upon decoding of DTMF signals corresponding to # and 9 keys in succession,
X upon decoding of DTMF signals corresponding to #, # and 9 keys in succession,
Y upon decoding of DTMF signals corresponding to #, #, # and 9 keys in succession,
, upon decoding of DTMF signals corresponding to #, # and 0 keys in succession,
. upon decoding of DTMF signals corresponding to #, #, # and 0 keys in succession.

3. The apparatus of claim 1, wherein said controller means outputs a line feed character upon the decoding of DTMF signals corresponding to #, # and * keys in succession.

4. The apparatus of claim 1, wherein said controller means outputs a clear character upon the decoding of DTMF signals corresponding to #, #, # and *.

5. The apparatus of claim 1, wherein characters output by said controller means change between upper case characters and lower case characters upon decoding of DTMF signals corresponding successively to # and * keys.

6. The apparatus of claim 1, wherein characters output by said controller means change between upper case characters and lower case characters upon decoding of DTMF signals corresponding successively to * and # keys and a character key.

7. The apparatus of claim 1, wherein said controller means outputs an upper case character upon decoding by said decoding means of DTMF signals corresponding to # key and a lower case letter upon decoding of DTMF signals corresponding to * key.

8. The apparatus of claim 1, wherein said controller means outputs (1) an upper case character responsive to successive DTMF signals corresponding to a special key used to represent * and a numerical key used to represent the character as decoded by said decoding means and (2) a lower case character responsive to successive DTMF signals corresponding to a special key representing # and a numerical key used to represent the character as decoded by said decoding means.

9. The apparatus of claim 1, including a display for displaying said particular alphabetical character in upper case or lower case.

* * * * *